C. B. HOWE.
TIRE FOR VEHICLE WHEELS.
APPLICATION FILED JULY 5, 1910.
1,037,829.
Patented Sept. 3, 1912.
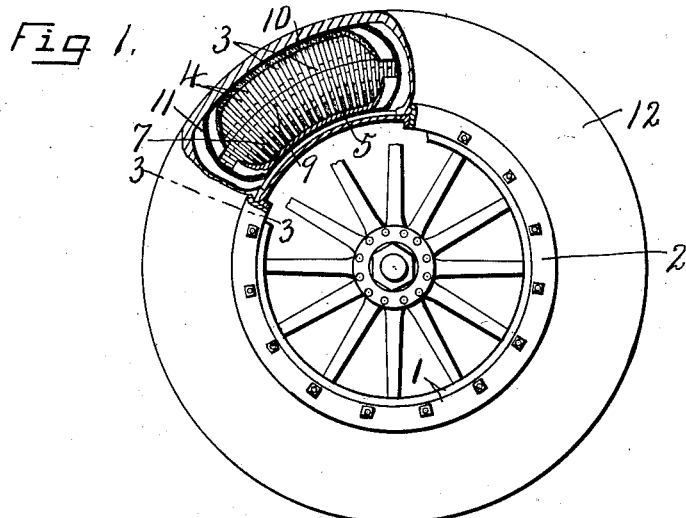
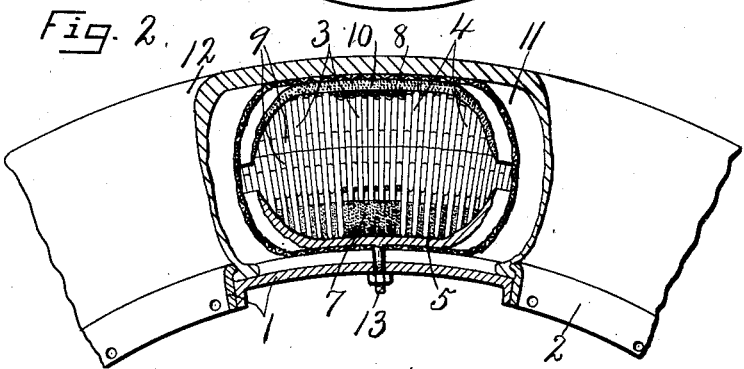
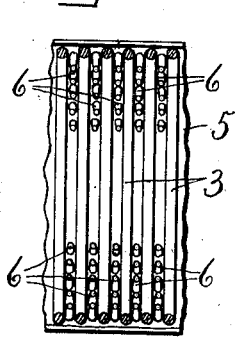
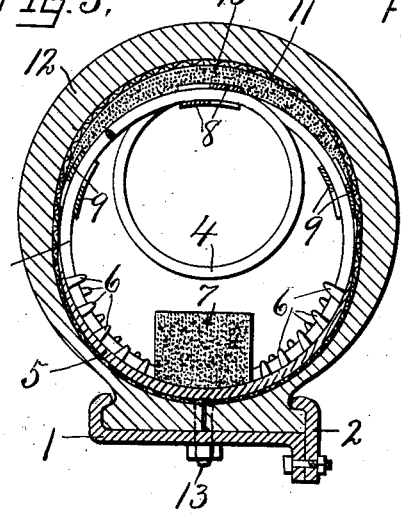
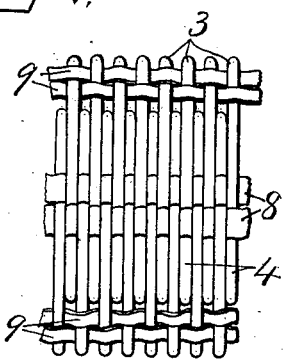
Witnesses:
R. W. Bailey
H. E. Chase
Inventor
C. B. Howe
By Howard P. Hinson
Attorney.

UNITED STATES PATENT OFFICE.

CLARENCE B. HOWE, OF UTICA, NEW YORK, ASSIGNOR OF ONE-HALF TO JAMES H. GOODIER, OF UTICA, NEW YORK.

TIRE FOR VEHICLE-WHEELS.

1,037,829.

Specification of Letters Patent.　　Patented Sept. 3, 1912.

Application filed July 5, 1910. Serial No. 570,288.

*To all whom it may concern:*

Be it known that I, CLARENCE B. HOWE, of Utica, in the county of Oneida, in the State of New York, have invented new and useful Improvements in Tires for Vehicle-Wheels, of which the following, taken in connection with the accompanying drawings, is a full, clear, and exact description.

This invention relates to certain improvements in vehicle wheels and refers more particularly to tires for automobiles and similar self-propelling machines in which resiliency in the action of the tire is desirable to relieve the running gear from excessive jar or vibration.

The main object is to produce a commercial substitute for the usual pneumatic tires without the use of any air inflated medium, and at the same time having all of the advantages of resiliency without liability of deflation or collapse. In other words, I have sought to avoid the dangerous and troublesome effects from puncture and bursting incidental to the use of such pneumatic tires by making the resilient expanding medium from spring wire bent into the form of coils of unequal diameters with their tread portions tangential and slidable relatively to each other, so as to afford gradually increasing tension as the load increases.

Another object is to provide means for retaining the convolutions of the coils against relative movement circumferentially of the wheel, and at the same time permitting a free resilient action of the convolutions throughout their lengths.

A further object is to flexibly bind or lace the convolutions of both coils together for the purpose of distributing compression strains at any one or more points to a multiplicity of the convolutions.

A still further object is to provide the inner base of the tire with a circumferentially extending resilient buffer normally spaced apart from, but adapted to be engaged by the inner portions of the smaller coil under increased load or excessive compression strains, thereby relieving the larger coil from undue action and at the same time gradually increasing the resistance to further compression of the tread of the tire.

Another object is to cover the outer portions of the coils with a flexible protective tread and to incase the entire combination including the coils and protective tread within a suitable sheathing capable of binding together the inclosed elements into a unitary serviceable tire which may be used in this form or incased in the usual rubber shoe or casing.

Other objects and uses relating to specific parts of the structure will be brought out in the following description.

In the drawings: Figure 1 is a side elevation of my improved vehicle wheel, portions of the rims and outer sections being broken away to show the coil spring. Fig. 2 is an enlarged elevation partly in section of a portion of the tire and rim shown in Fig. 1. Fig. 3 is an enlarged transverse sectional view taken on line 3—3, Fig. 1. Fig. 4 is an enlarged top plan of a portion of the spring wire convolutions showing particularly the lacings or flexible binding straps for holding the outer and side portions of the coils against undue circumferential movement relatively to the tire and also for distributing the compression strains which may be applied at any point over a series of the convolutions. Fig. 5 is a top plan of the metallic base plate or inner supporting rim for the spring coils.

In illustrating the construction and operation of my invention I have shown a vehicle wheel as provided with an ordinary wheel rim —1— adapted to receive and support my improved tire presently described, said rim being provided with a removable side section —2— to permit the tire to be easily removed and replaced when necessary.

The tire comprises a plurality of, in this instance two, coils —3— and —4— of unequal diameters preferably made from a single piece of spring steel wire of suitable size having their convolutions alternating with each other in close proximity, the outer portions of the convolutions of the smaller coil merging with the adjacent portions of the convolutions of the larger coil, and, therefore, the outer portions of both coils near the tread of the tire are substantially tangential to each other leaving their inner portions spaced some distance apart. The convolutions of the coils are substantially circular transversely of the tire and are arranged so that the base portions of the convolutions of the larger coil rest upon the outer concave side of a concavo-convex metal supporting rim —5— having shoulders or spurs —6— projecting inwardly between the convolutions of the larger coil to hold the latter against relative circumferential movement on the rim —5—.

A yielding buffer —7— of felt or other flexible material is seated circumferentially around and upon the outer face of the central portion of the rim —5— within the space between the inner sides of the coils —3— and —4— and normally spaced apart from the inner side of the smaller coil —4—, so as to allow a limited flexing action of the convolutions of the larger coil —3— under compression strains or load, said flexible buffer —7— serving as a yielding limiting stop for the coil —4— when the tire is subjected to a heavy load, thereby transmitting a portion of the load to the smaller coil which offers increased yielding resistance to further compression, thereby adapting the tire to resilient action under light or heavy loads.

The spurs or shoulders —6— extend from opposite sides of the buffer —7— outwardly along opposite sides of the base of the large coil —3— but terminate just below the transverse or horizontal diameter of the convolutions of said coil, thereby holding the convolutions of the coils in nearly radial planes, said spurs or shoulders being gradually increased in radial depth from the base of the rim —5— outwardly so that the outer spurs project inwardly a greater distance beyond the adjacent convolutions than the inner spurs to allow a greater inward flexing action of said convolutions without liability of becoming displaced from between the adjacent sets of spurs or shoulders.

The outer portions of the convolutions of the coils —3— and —4— are bound or laced together by flexible bands or straps —8— extending circumferentially entirely around the coils over and under successive convolutions, so as to flexibly tie said convolutions together for the purpose of distributing strains from one to the other when pressure is applied at any one point. In like manner opposite sides of the convolutions of the coil —3— are tied together by similar flexible straps —9— located just above the transverse or horizontal diameter of the coil —3— for distributing the strains which may be applied to any one point to a number of adjacent convolutions and at the same time permitting a free flexing action of the coils. The outer portions of the coils —3— and —4— nearest the tread of the tire are surrounded by a comparatively thick protective pad —10— of flexible material, such as felt, but preferably a composition of felt and rubber which is thickest at the tread and gradually decreases in thickness around toward the sides of the larger coil —3—, the inner edges of the pad terminating just above the transverse or horizontal diameter of the larger coil to protect the outer shoe or casing against abrasion by the springs.

The tie pieces —8— and —9— may be made of canvas or equivalent tough but flexible material capable of withstanding the strains to which they may be subjected and may be secured at intervals by any well known fastening means, such as rubber-cement or stitching, not shown, to the flexible pad —10— to hold the latter in place.

The tire as thus far described comprising the coils —3— and —4—, rim —5— and pad —10— together with the lacings —8— and —9— and buffer —7—, may constitute a unitary structure adapted to be carried with the machine to be used as an emergency tire, but when in constant use it may be provided with a fabric jacket —11—, of canvas or similar tenacious material, entirely enveloping the coils to exclude dirt and other foreign matter therefrom, or the whole device with or without the jacket —11— may be inserted in the usual rubber shoe or casing —12—, commonly used with pneumatic tires, in which case the base of the casing —12— will be secured in the usual manner to the rim —1— of the wheel. The supporting base or rim section —5— of the tire is provided at intervals with inwardly projecting bolts or studs —13— passing through apertures in the wheel rim —1— to further secure the tire to the rim against circumferential or lateral movement on said rim.

As best seen in Fig. 4, the lacings or tie pieces —8— and —9— are interwoven (basket-like) with the convolutions of the coils and serve not only to distribute compression strains applied to any point, but also effectively hold the convolutions of the coils in substantially radial planes, so as to more effectively prevent such convolutions from flattening down under load during the travel of the wheel over the ground.

In operation, the load upon the tread of the tire is transmitted to both coils tending to compress their outer portions inwardly, but with gradually increasing tension, so that as the load increases or the tire encounters any obstruction tending to further compress the tread inwardly, the inner portion of the coil —4— will engage the resilient buffer —7—, thereby easing the shock and transmitting the excess load to the smaller coil which offers greater resistance and enables the tire to sustain a heavy load and still maintain its resiliency, thus quickly restoring the tire to its original form as soon as the pressure is relieved.

What I claim is:

A vehicle wheel comprising an outer shoe, a rim to which said shoe is connected, a protective pad within said shoe, an inner rim within said shoe, a spiral coil with alternately-arranged different-sized convolutions interposed between the pad and said inner rim, equally-spaced apart rows of oppositely graduated lugs upon said inner rim, a coiled convolution positioned between each of said rows, tie pieces interlaced with the convolutions of the spring and secured to said pad, a buffer carried by the inner rim and interposed between the lugs and opposite to the convolutions of lesser diameter, and adapted for cushioning said smaller convolutions, and hold-fast devices positioned through the two rims.

In witness whereof I have hereunto set my hand on this 28th day of June, 1910.

CLARENCE B. HOWE.

Witnesses:
W. L. GOODIER,
LULU L. GOODIER.